United States Patent [19]

Aubry et al.

[11] Patent Number: 5,082,314
[45] Date of Patent: Jan. 21, 1992

[54] DEVICE FOR CONNECTING THE ENDS OF A COMPOSITE TUBE SUBJECTED TO SEVERE AXIAL STRESS WITH METALLIC COLLARS AND MANUFACTURING PROCESS THEREFOR

[75] Inventors: Jacques A. Aubry, Cabries; Daniel A. Mauduit, Frejus, both of France

[73] Assignee: Aerospatiale Societe Nationale Industrielle, Paris, France

[21] Appl. No.: 419,240

[22] Filed: Oct. 10, 1989

[30] Foreign Application Priority Data

Oct. 13, 1988 [FR] France .................. 88 13468

[51] Int. Cl.$^5$ ............................................. F16L 55/17
[52] U.S. Cl. ..................................... 285/174; 285/238; 285/239; 285/415; 285/423
[58] Field of Search ............... 285/174, 238, 234, 415, 285/423

[56] References Cited

U.S. PATENT DOCUMENTS

| 964,579 | 7/1910 | Stephens | 285/174 |
|---|---|---|---|
| 1,913,030 | 6/1933 | Hux | 285/415 X |
| 2,069,141 | 1/1937 | Furlong | 285/238 |
| 3,966,234 | 6/1976 | Sundholm | 285/415 X |
| 3,989,280 | 11/1976 | Schwarz | 285/239 X |
| 4,093,280 | 6/1978 | Yoshizawa et al. | 285/423 X |
| 4,428,602 | 1/1984 | Lambot et al. | 285/174 X |

FOREIGN PATENT DOCUMENTS

| 0266810 | 5/1988 | European Pat. Off. . |
|---|---|---|
| 1550048 | 9/1969 | Fed. Rep. of Germany . |
| 7219612 | 8/1972 | Fed. Rep. of Germany . |
| 2321769 | 11/1974 | Fed. Rep. of Germany . |
| 2434300 | 11/1978 | France . |
| 2051304 | 1/1981 | United Kingdom . |

Primary Examiner—Dave W. Arola
Attorney, Agent, or Firm—Armstrong, Nikaido, Marmelstein, Kubovcik & Murray

[57] ABSTRACT

A joint is provided for connecting an end of a tube of composite material which is subject to relatively large axial stress to an annular metallic ferrule, and includes a composite tube composed of high strength fibers agglomerated by a polymerized synthetic resin having a wall and an annular metallic ferrule formed as a band. The ferrule has in cross-section the shape of a segment of a circle including a curved portion and a flat portion, the curved portion of the ferrule facing the composite tube. The ferrule is embedded in a receiving surface of the wall of the tube, and the flat portion of the ferrule is flush with adjacent regions of the receiving surface of the tube. An end member is included having an extending portion which engages the ferrule, and a complementary connecting device is disposed between the flat portion of the ferrule and the extending portion of the end member, for connecting the tube to the end member. The band and the complementary connecting arrangement together constitute an anchoring element for anchoring the tube of composite material to the end member.

9 Claims, 3 Drawing Sheets

DEVICE FOR CONNECTING THE ENDS OF A COMPOSITE TUBE SUBJECTED TO SEVERE AXIAL STRESS WITH METALLIC COLLARS AND MANUFACTURING PROCESS THEREFOR

BACKGROUND OF THE INVENTION

Invention to a device for axially connecting a tube of composite material to metallic end pieces and more particularly to a device using the incorporation into the composite structure of a metallic ferrule serving as an anchoring piece for the end pieces.

The invention is more especially intended, among other applications to equip the landing gear of aerodynes particularly light aeroplanes or helicopters, the tubular columns of which, advantageously made of a composite material, have, on one hand, to withstand the internal pressure and, on the other hand, to resist axial tensile and compressive stresses.

In the field concerned with the connection of columns or shafts of composite materials to metallic end pieces, there have been proposed a certain number of solutions which can give satisfaction in specific applications but which remain inadequate for uses involving severe stresses, as is the case of the jacks and shock absorbers of landing gear tyres.

Document FR-A 2 434 300 describes a transmission shaft element of fiber reinforced plastic material in which there are provided means for ensuring interconnection between the shaft itself and the yoke of a universal joint that is efficient and adequate to withstand the forces of flexion and torque to which the element is subjected. For this purpose, the shaft is connected to a sleeve that is integral with the yoke via mechanical anchoring means constituted, for example, by an annular rib, possibly associated with other excrescences such as ridges, bosses or corrugations. Anchoring is effected from a rib provided on the end piece which bears on a corresponding impression provided on the tube. This known connection is only designed, however, to allow for bending stress and torque, and not tensile and compressive stresses.

According to document FR-A 2 343 918, it is known to make a control rod whose tubular body, composed of high strength fibers agglomerated by a polymerized synthetic resin, is made integral with a metallic end piece having external scores and corrugations. To obtain the rod, strips of suitable fibers encapsulated in unpolymerized epoxy resin, the fibers being parallel or in braids, are wound onto the mandrel of the tubular body, equipped with its metal end pieces. Several layers of fibers are wound on in this way, orientated in different directions. At the ends, the layers of fibers mate with the scores or corrugations; after polymerization, the binding of the fibers over the scored portions of the end pieces gives a rod whose end pieces very satisfactorily fixed to the tubular body and which is capable of withstanding tensile and compressive stresses.

There also exists another method of connection, as described in document U.S. Application No. 3 989 280, which consists in providing a connection between a pipe of composite material and a metallic pipe via a collar or a peripheral shoulder integral with a pipe and on which the other pipe is manufactured.

In all these solutions interference of form thus occurs, at a given point between the part made of composite material and a metallic end piece. Quite often, the metallic end piece therefore has to be given a special shape, with ribs for example, to be able to cooperate with the portion made of composite material. Sometimes, this type of connection makes it necessary for the metallic end piece or the composite tube to have an irregular inner or outer surface in the region of the ribs which can hinder the passage of sliding members. Apart from these drawbacks, the strength of these types of connection can prove inadequate for tubular columns subjected to severe tensile and compressive stresses, as is the case of hydro-pneumatic landing gear helicopters.

SUMMARY OF THE INVENTION

The object of the invention is to provide a device for connecting the ends of a tube of composite material subjected to severe axial stresses, with metallic collars, which is constituted by an annular metallic ferrule forming a band, embedded in the thickness of the composite tube outside or inside the latter and made flush with the outside or inside diameter of the composite tube, the band constituting an anchoring element for an end piece or other metallic fitting with the help of a complementary axial connection means.

According to one particular characteristic of the invention, connection between the band integral with the composite tube and the metallic end piece is ensured by a metallic annulus housed in two semi-circular grooves provided on one side on the outer face of the band and on the other side on the inner face of the end piece, or alternatively, this connection is obtained by means of a thread provided on the outside of the band, onto which thread the end of the end piece is screwed, or again, by means of a ring integral with the band cooperating with a flange integral with the end piece.

Alternatively, the annular band has a polygonal external or internal shape that interferes in torsion with a corresponding polygonal internal or external shape of the composite tube.

The object of the invention is also to provide a process for the manufacture of the connecting device which consists in winding fibers pre-impregnated with thermosetting synthetic resin or draping a fabric pre-impregnated with this same type of resin around a mandrel pre-capped with an inflatable bladder, in surrounding the mandrel with an external mould pre-fitted with ferrules whose overlapping inner faces are in the shape of an arc of a circle, in inflating the bladder by applying a pressurized fluid, for example compressed air through ducts, so that the ferrules are hugged by the wound fabrics or fibers, and embedded in the composite material, in hot polymerizing the fiber or fabric impregnating resin under pressure and, after stripping from the mould, in making the ferrule flush with the inside or outside diameter of the tube to obtain an anchoring band whose inner or outer surface is aligned with the adjoining surface of the tube of composite material, and in fixing the metallic fitting onto the anchoring band using a connecting means. The constituents of the composite material of the tube can also be placed in the mould by stacking dry braids on a mandrel equipped with annular bands followed by injecting the synthetic resin under pressure, or again by filament winding yarns or ribbons pre-impregnated with resin on a mandrel equipped with annular ferrules.

BRIEF DESCRIPTION OF THE DRAWINGS

Other specific features and advantages of the invention will emerge from the following description of the connecting device and the process for manufacturing same with reference to the annexed drawings, wherein.

DETAILED DESCRIPTION OF THE PREFERRED EMBODIMENT

Figure 1:
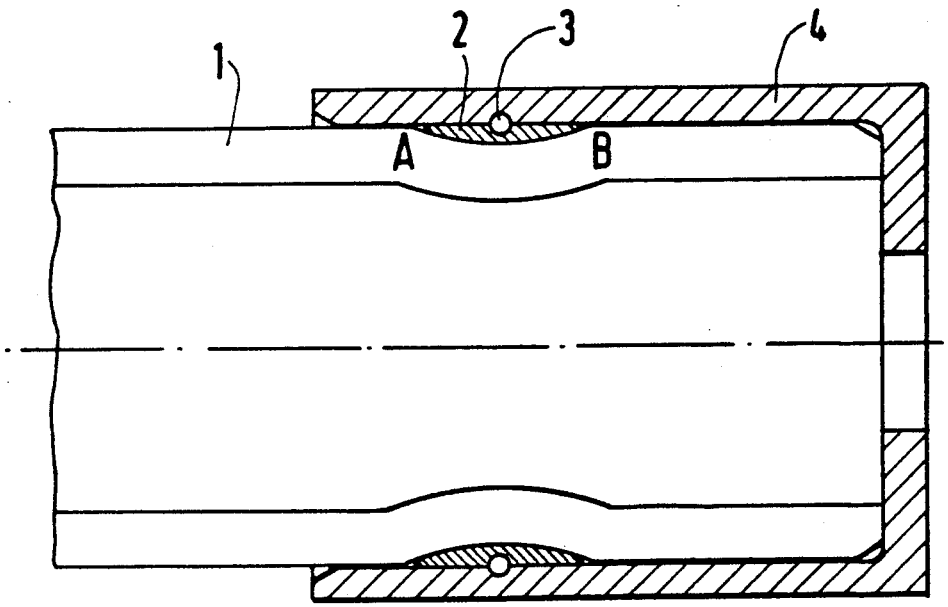
FIG. 1 is a cross-sectional view of the connecting device.

FIG. 1 diagrammatically represents the axial connection of a composite tube 1 and a metallic end piece 4 fitted onto the end of the said tube. To effect this connection, an annular ferrule 2 having in cross-section the shape of a segment of a circle has been inserted on the outside of the composite tube. The curved portion AB of this segment faces the tube and is disposed in the manufacturing equipment in such a way that it projects into the tube and, by construction, remains embedded in the composite material, as will be seen later. A connection via annulus 3 is provided between the said ferrule and end piece 4. Through interference of forms, there is no longer any possibility of the end piece being axially placed over the tube, even under high axial stresses.

These axial stresses are in fact transmitted from the tube of composite material into the annular ferrule via a bearing surface constituted by the spherical cap, which is relatively large in such a way that the caulking pressure on the composite material of the tube remains moderate and there is consequently no risk of its damaging the said material. On the other hand, the connection of the annular ferrule with the end piece via the annulus makes it possible to subject the grooves of its housing provided in metallic pieces, as well as the annulus itself, which is also metallic, to very substantial caulking pressures without there being any risk of damage to the metal of the elements providing the said connection.

Figure 2:
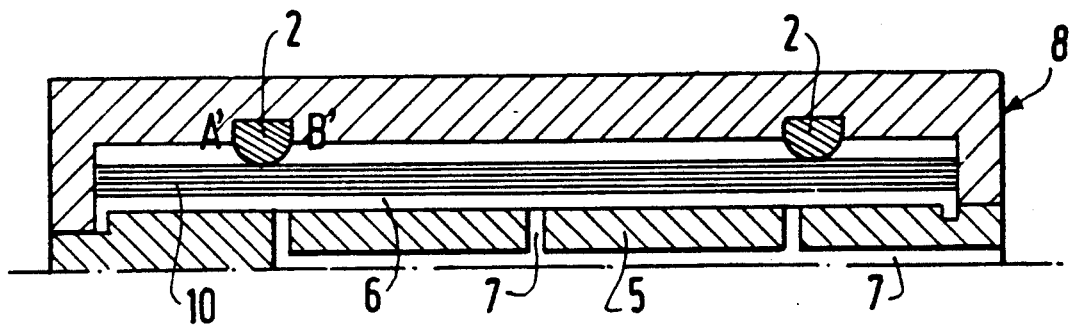
FIGS. 2 and 2 are schematic cross-sectional views of a manufacturing process.
Figure 3:
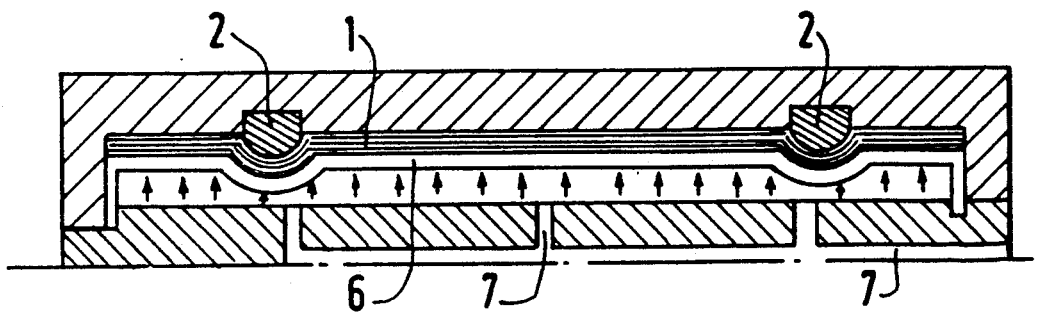

The stages whereby such a connection is obtained will now be described in greater detail with reference to FIGS. 2 and 3.

A mandrel 5 is capped with an inflatable bladder 6, compressed air supply ducts 7 enabling a pressure to be created in the chamber delimited by the mandrel and the bladder. Fibers are wound or a pre-impregnated fabric 10 is draped right around the mandrel, above the bladder. The mandrel is surrounded by an external mould 8 pre-fitted with ferrules whose projecting inner faces A'B' have the shape of an arc of a circle. When the inflatable bladder 6 is deformed by applying compressed air via ducts 7, interference of form will be obtained between the composite tube 1 in the process of formation (FIG. 3) and the ferrules 2. There are thus obtained ferrules 2 external to the composite tube, hugged by the fabrics 10 or the wound fibers, which are thus embedded in the composite material. The impregnating resin is hot polymerized under pressure. The tube with its ferrules is then stripped from the mould.

After it has been machined round to make it flush with the outside diameter of the composite tube each ferrule 2 forms a band than constitutes an excellent anchoring for axial connection of the tube to its metallic end pieces whose outer surface is aligned with the adjoining outer surface of the composite tube. As indicated with reference to FIG. 1 this connection can be effected using a metallic annulus 3 accommodated in two semi-circular grooves provided on one side on the outer face of band 2 and on the other side on the inner face of end piece 4.

Figure 4:
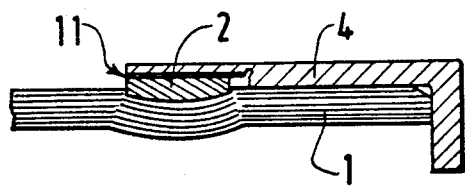
FIGS. 4 and 5 are two alternative embodiments of a tube-end piece connection.
Figure 5:
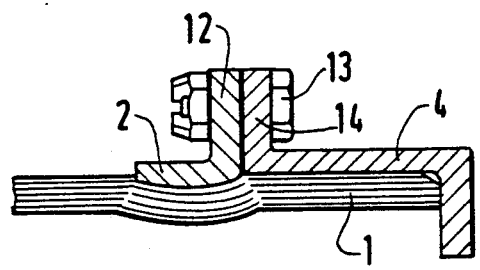

Connection can also be affected using a thread 11 provided on the outside of band 2, onto which the end of end piece 4 is screwed FIG. 4). Or again, connection can be realized using a ring 12 integral with band 2 fixed by bolted connection 13 to a flange 14 integral with end piece 4 (FIG. 5).

Alternatively, and in oases in which torque stress is added to the axial and radial stresses, the principle of interference of forms between the ferrule and the composite material of the tube remains valid; it then suffices to give the annular ferrule an outer or inner polygonal shape that interferes in torsion with a corresponding inner or outer polygonal shape of the tube. The foregoing description refers to ferrules forming bands located on the outside of a composite tube. It goes without saying that the same technique could be applied without departing from the scope of the invention, to ferrules placed inside a composite tube or column with a view to connection with a metallic part internal to the said tube.

Figure 6:
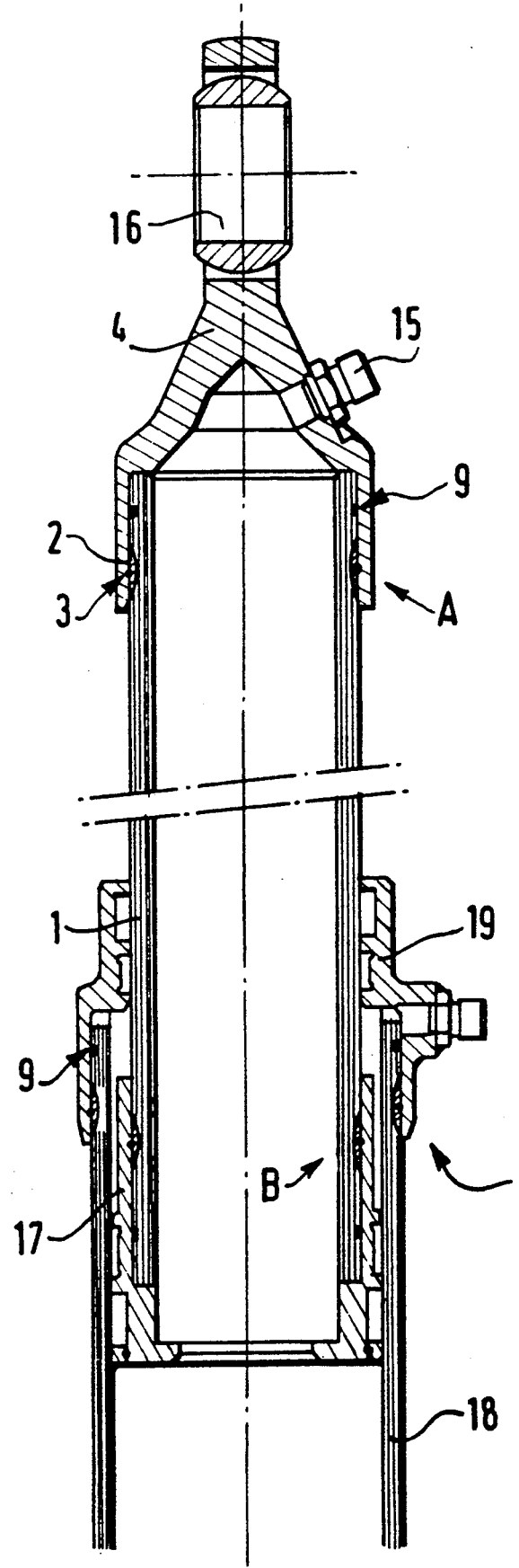
FIGS. 6 is an example of use of the connecting device.

FIG. 6 gives an example of use on an oleo-pneumatic landing gear unit. The jack type shock absorber comprises an end piece 4 fitted with a connector 15 for communication with an external hydraulic circuit; the end of the end piece is extended by a ball joint type yoke 16 for articulating the shock absorber on the fuselage. End piece 4 is fixed to the composite tube 1 by the connection described, that is to say the band 2 and the annulus 3 (connection A). It should be noted that a seal 9 is located between the end of the tube and the band.

At the other end composite tube 1 is connected (reference B), again using the same band and annulus connection, to a piston 17 designed to slide in a composite hollow rod 18, itself fixed, once again by means of the same connection type (reference C) to a bearing 19 projecting radially inwards to permit sliding sealingly over the tube 1. Other identical connections not shown, can be provided between any other tubes and composite rods and the end pieces or metallic fittings to which they have to be connected. O-rings 9 are interposed between sleeve and tube to ensure complete tightness. These connections make it possible to absorb axial stress in traction and compression. The tightness of the internal cavity of the tube is ensured by means of seals 9. It will also be noted that there are no additional thicknesses in relation to the composite tube, which makes it possible to fit sleeves or pistons on the inside and outside diameters of the tube, as well as to remove the end pieces.

Composite tubes fitted with these connecting bands 2 can be produced by draping sheets of pre-impregnated fabrics followed by compacting using an inflatable bladder as already described with reference to FIGS. 2 and 3. They can also be obtained by stacking dry braids, followed by impregnation by injection under pressure, or again, by filament winding yarns or ribbons.

Figure 7:
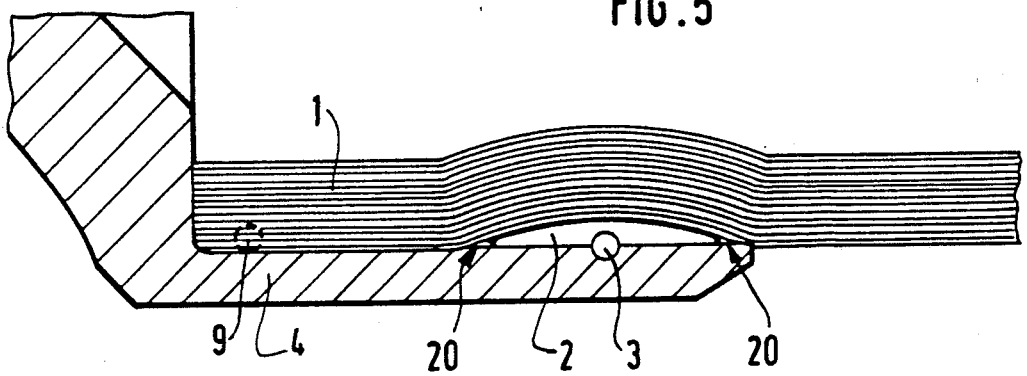
FIGS. 7 and 8 are larger scale cross-sectional views of certain connections according to FIG. 6.

FIG. 7 is a larger scale illustration of connection A in FIG. 6, showing the arrangement of the fabrics constituting the composite tube 1. It will be noted that wedge-shaped areas of resin 20 form between the fabrics and band 2 at the points of contact between the tube and end piece 4. O-ring seal 9 would occupy the position shown by the dotted line.

Figure 8:
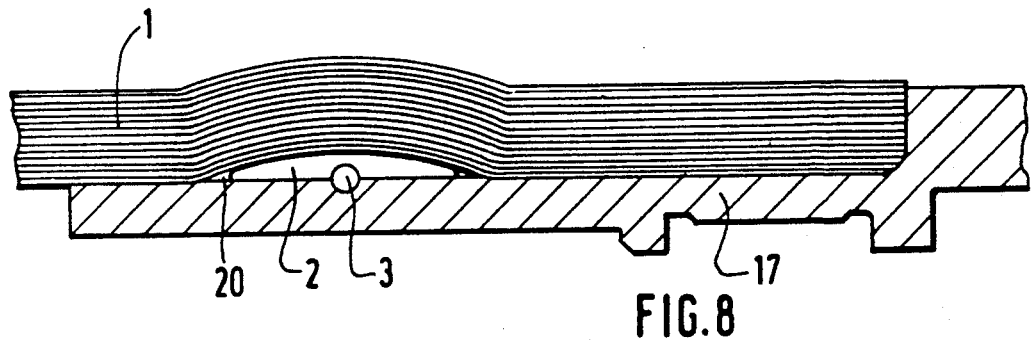

In the same way, FIG. 8 shows the arrangement of the fabrics in connection B between tube 1 and piston 17. The wedges of resin 20 are again to be found along the edge of band 2.

I claim:

1. A joint for connecting an end of a tube of composite material which is subject to relatively large axial stress to an annular metallic ferrule, comprising:

a composite tube composed of high strength fibers agglomerated by a polymerized synthetic resin having a wall;

an annular metallic ferrule formed as a band, having in the entire cross-section the shape of a segment of a circle including a curved portion and a flat portion, said curved portion of said ferrule facing said composite tube, said annular metallic ferrule being embedded in a receiving surface of said wall of said tube, and said flat portion of said annular metallic ferrule having a substantially uniform diameter and being flush with adjacent regions of said receiving surface of said tube;

an end member having an extending portion which engages said annular metallic ferrule;

a complementary connecting means disposed between said flat portion of said annular metallic ferrule and said extending portion of said end member, for connecting said tube to said end member;

wherein said band and said complementary connecting means together constitute an anchoring element for anchoring said tube of composite material to said end member.

2. Connecting device according to claim 1, wherein said tube has at least one semi-circular groove on an outer surface thereof, and said curved portion of said annular metallic ferrule is disposed in said semi-circular groove for connection of said band flush with adjacent regions of said receiving surface, and wherein said flat portion of said annular metallic ferrule engages an inner face of said end member.

3. Connecting device according to claim 1, wherein said receiving surface of said wall of said composite tube of said tube has a polygonal cross-sectional shape in a circumferential direction and said annular metallic ferrule has a polygonal shape that interferes in torsion with said receiving surface of said tube.

4. A joint for connecting an end of a tube of composite material which is subject to relatively large axial stress to an annular ferrule, comprising:

a composite tube composed of high strength fibers agglomerated by a polymerized synthetic resin having a wall;

an annular metallic ferrule formed as a band, having in the entire cross-section the shape of a segment of a circle including a curved portion and a flat portion, said curved portion of said ferrule facing said composite tube, said annular metallic ferrule being embedded in a receiving surface of said wall of said tube;

an end member having an extending portion which engages said annular metallic ferrule;

wherein connection between said band and said end member is realized by a thread provided on the entire surface of said flat portion of said band, said thread being in threaded engagement with said extending portion of said end member.

5. A joint as claimed in claim 4, wherein said extending portion of said end member is received within said composite tube.

6. A joint as claimed in claim 4, wherein said composite tube is received within said extending portion of said end member.

7. A joint for connecting an end of a tube of composite material which is subject to relatively large axial stress to an annular metallic ferrule, comprising:

a composite tube composed of high strength fibers agglomerated by a polymerized synthetic resin having a wall;

an annular metallic ferrule formed as a band, having in cross-section the shape of a segment of a circle including a curved portion and a flat portion, said curved portion of said ferrule facing said composite tube, said annular metallic ferrule being embedded in a receiving surface of said wall of said tube;

an end member having an extending portion which engages said annular metallic ferrule; and said extending portion terminates in a flange, and a ring is connected to said ferrule, wherein connection between said band and said end member is realized by a bolted connection between said ring and said flange end member.

8. A joint as claimed in claim 7, wherein said extending portion of said end member is received within said composite tube.

9. A joint as claimed in claim 7, wherein said composite tube is received within said extending portion of said end member.

* * * * *